United States Patent [19]
El-Hamamsy et al.

[11] Patent Number: 5,118,996
[45] Date of Patent: Jun. 2, 1992

[54] STARTING CIRCUIT FOR AN ELECTRODELESS HIGH INTENSITY DISCHARGE LAMP

[75] Inventors: Sayed-Amr A. El-Hamamsy, Schenectady; John P. Cocoma, Clifton Park; George A. Farrall, Rexford, all of N.Y.

[73] Assignee: General Electric Company, Schenectady, N.Y.

[21] Appl. No.: 719,855

[22] Filed: Jun. 24, 1991

[51] Int. Cl.⁵ .................................. H05B 41/16
[52] U.S. Cl. ................................ 315/248; 315/344; 313/234
[58] Field of Search ............ 315/248, 344, 39, 85, 315/348, 267; 313/234

[56] References Cited
U.S. PATENT DOCUMENTS

| | | | |
|---|---|---|---|
| 4,810,938 | 3/1989 | Johnson et al. | 315/248 |
| 4,812,702 | 3/1989 | Anderson | 313/153 |
| 4,894,589 | 1/1990 | Borowiec | 315/248 |
| 4,894,590 | 1/1990 | Witting | 315/248 |
| 4,902,937 | 2/1990 | Witting | 315/248 |
| 4,972,120 | 11/1990 | Witting | 313/638 |
| 5,057,750 | 10/1991 | Farrall | 315/248 |

*Primary Examiner*—Eugene R. Laroche
*Assistant Examiner*—Amir Zarabian
*Attorney, Agent, or Firm*—Jill M. Breedlove; James C. Davis, Jr.; Marvin Snyder

[57] ABSTRACT

A passive starting circuit for an electrodeless HID lamp includes a series resonant LC circuit including an inductor of variable impedance coupled in series with the parasitic capacitance between a starting probe and the excitation coil of the lamp, and further including a coupling capacitance for directly coupling the starting circuit to the excitation coil. The coupling capacitance is connected between the high terminal of the excitation coil, or a point in the circuit at approximately the same potential thereof, and a conductive support for holding the lamp and starting probe in a lamp fixture. In this way, the starting voltage is maximized for more efficient and rapid starting. Preferably, the series resonant capacitance of the starting circuit is optimized so that the ballast requires little, if any, retuning after the lamp has started.

12 Claims, 8 Drawing Sheets

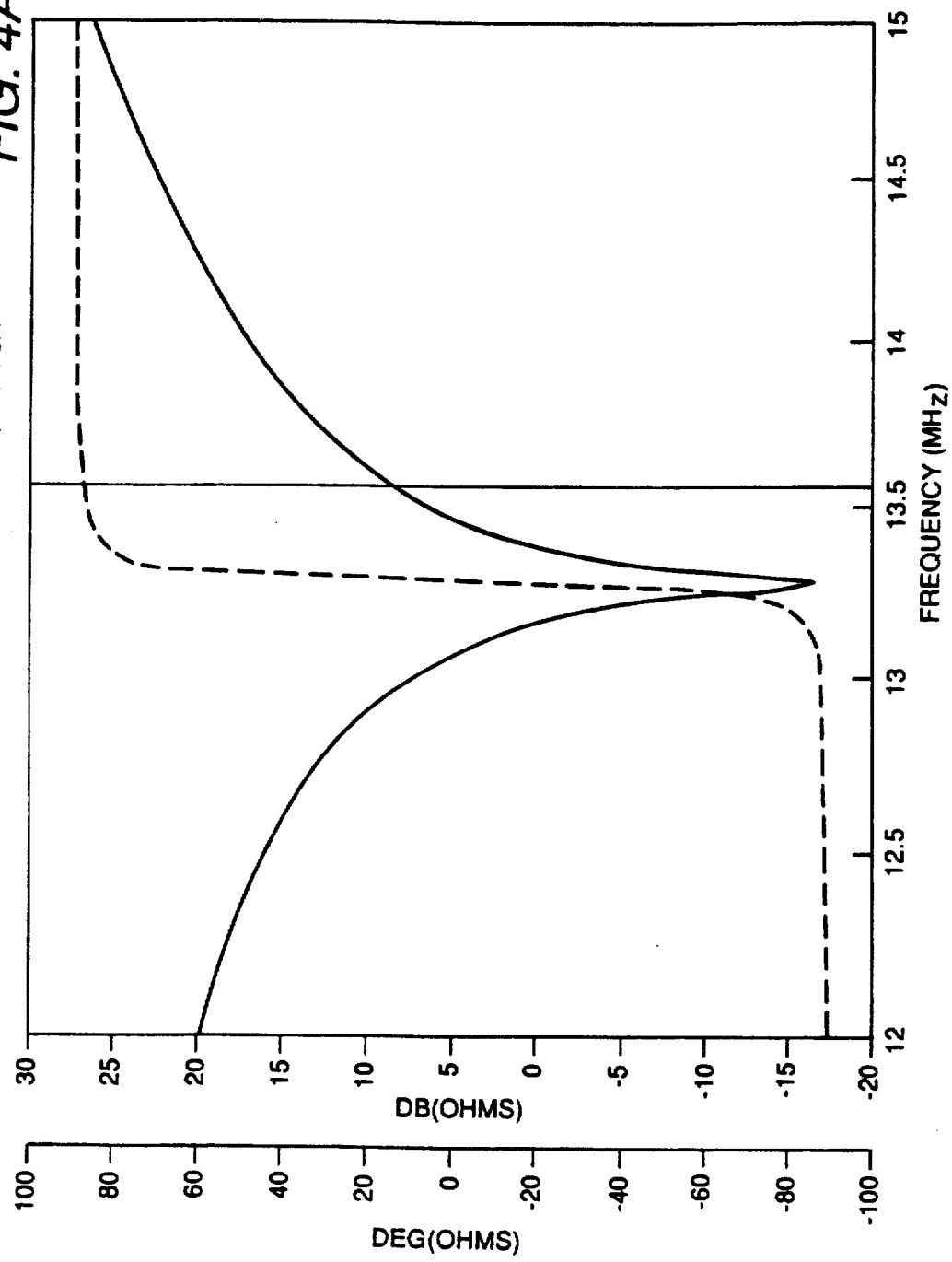

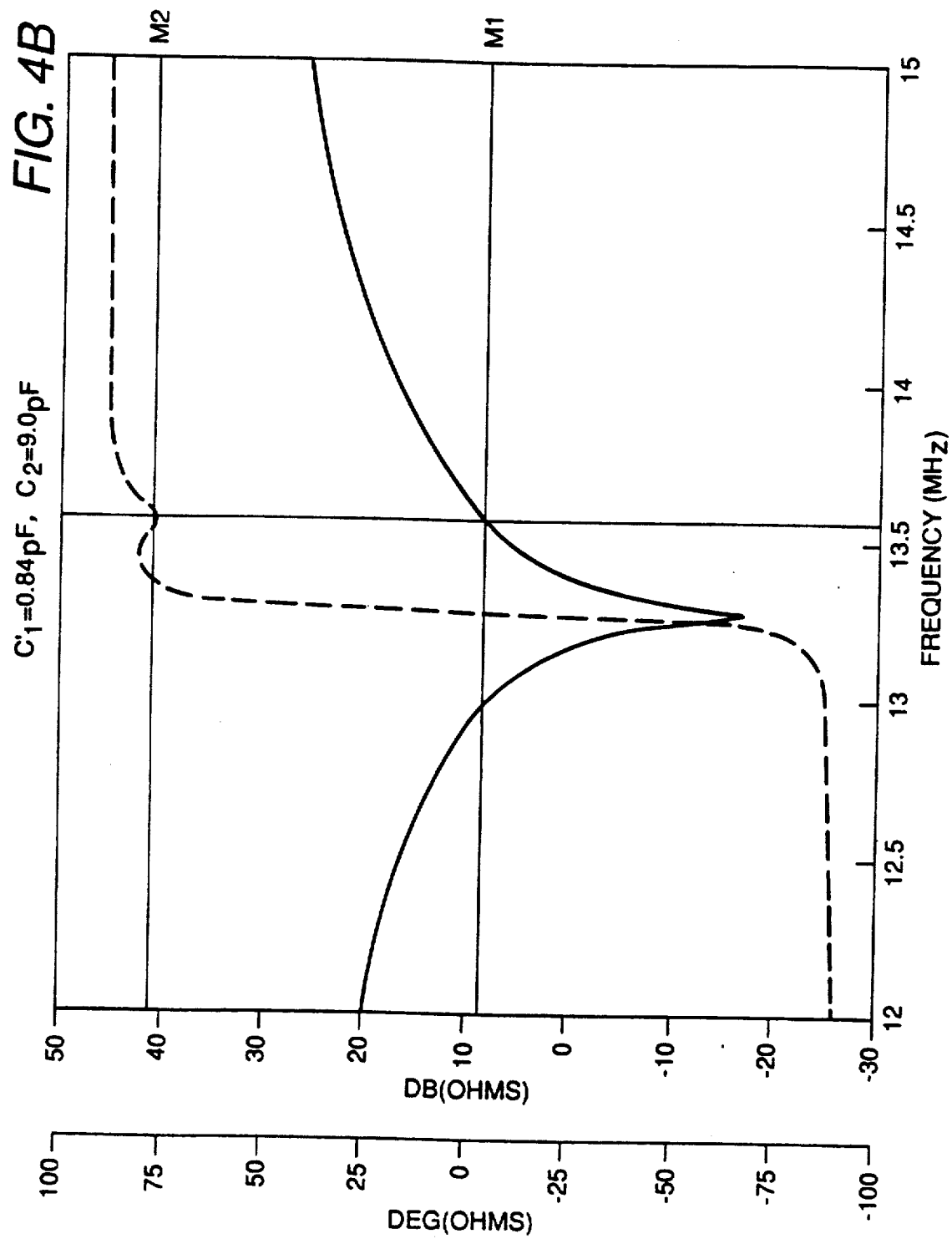

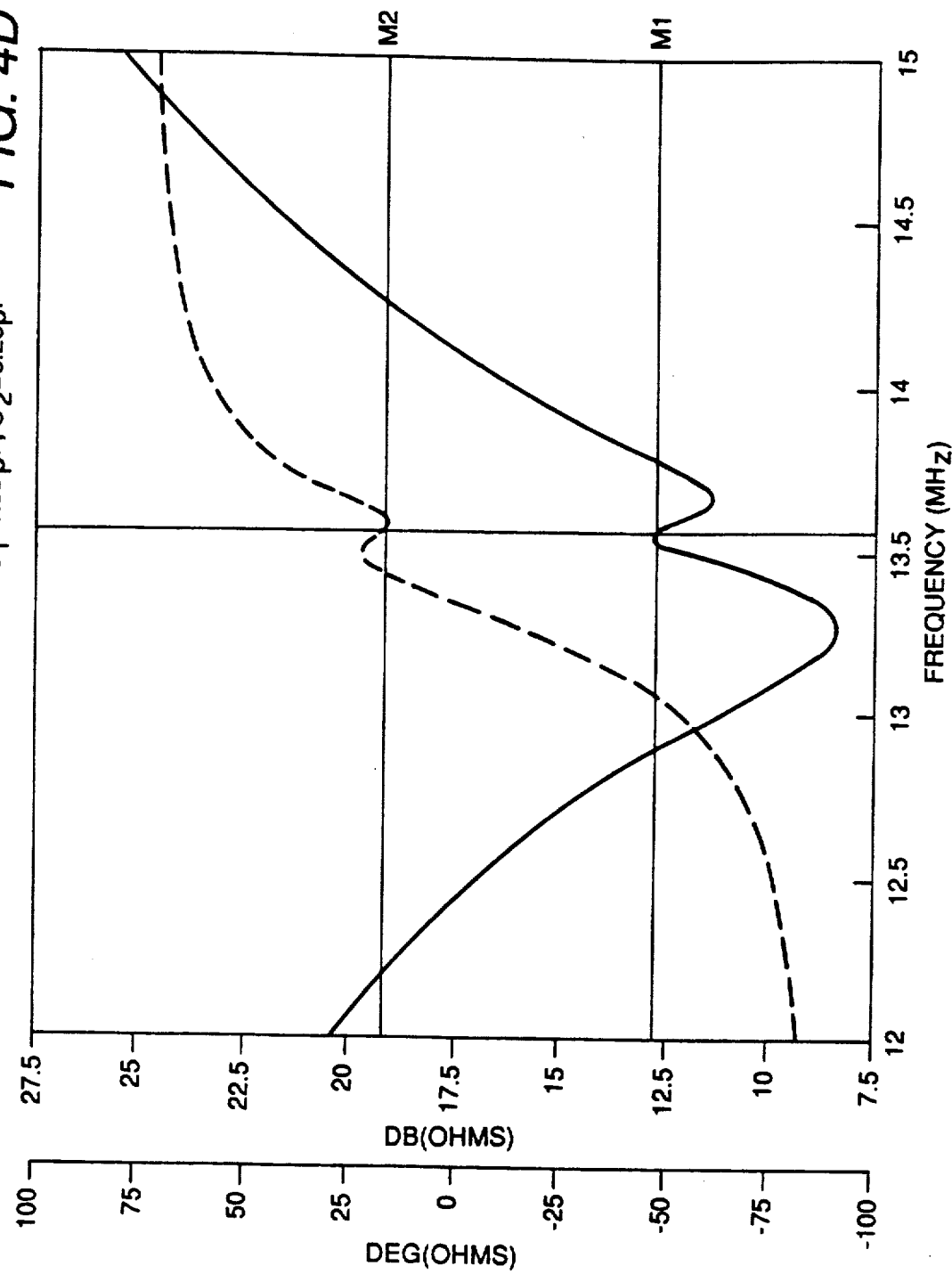

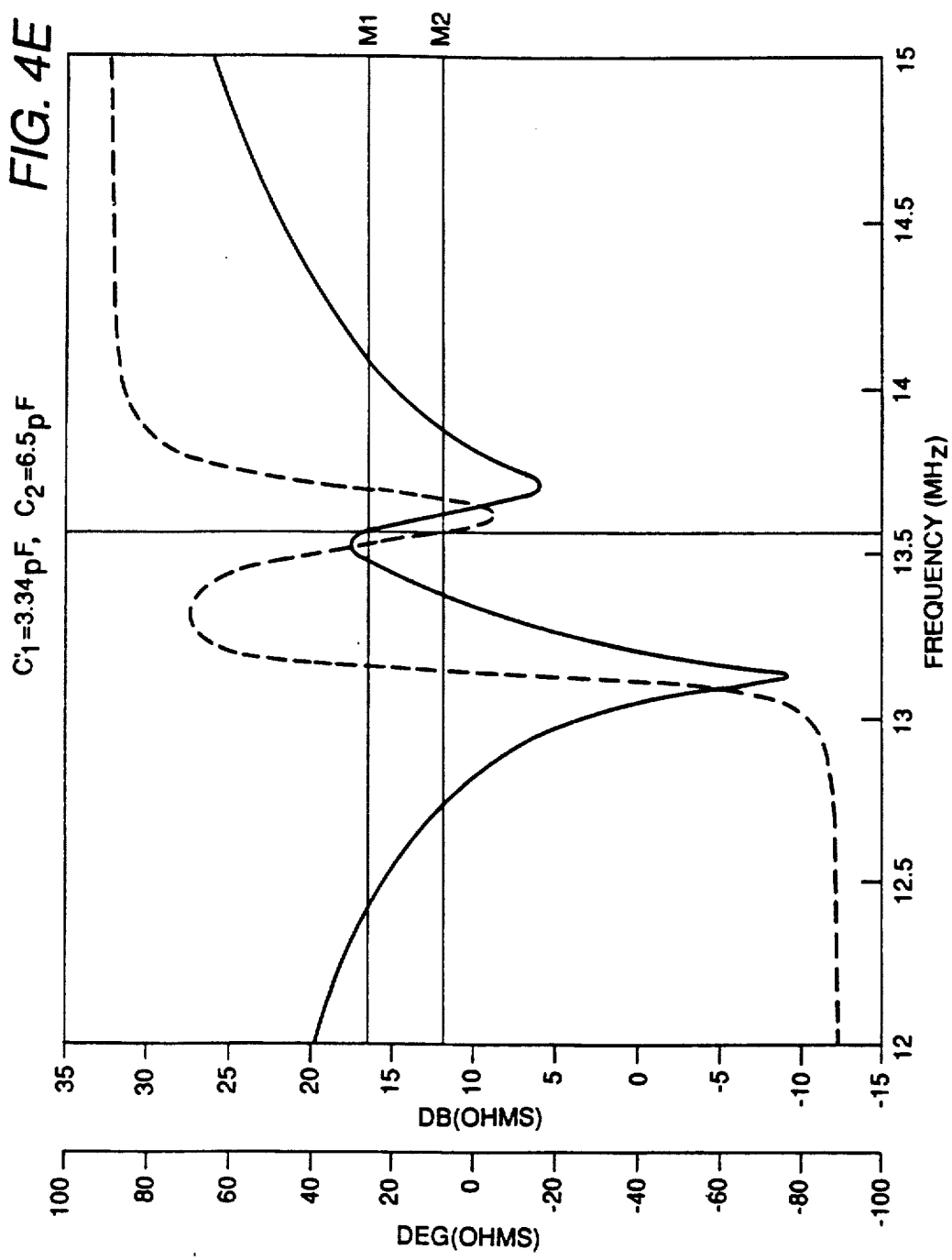

STARTING CIRCUIT FOR AN ELECTRODELESS HIGH INTENSITY DISCHARGE LAMP

RELATED PATENT APPLICATION

This application is related to commonly assigned, copending U.S. patent application Ser. No. 719,450 of S. A. El-Hamamsy and J. Blackmore, filed concurrently herewith and incorporated by reference herein.

FIELD OF THE INVENTION

The present invention relates generally to electrodeless high intensity discharge (HID) lamps and, more particularly, to a passive resonant starting circuit for such a lamp.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. One way to overcome this shortcoming is to lower the gas pressure of the fill, for example, by first immersing the arc tube in liquid nitrogen so that the gas temperature is decreased to a very low value and then allowing the gas temperature to increase. As the temperature rises, an optimum gas density is eventually reached for ionization, or breakdown, of the fill to occur so that an arc discharge is initiated. However, the liquid nitrogen method of initiating an arc discharge is not practical for widespread commercial use.

More recent methods for starting electrodeless HID lamps entail using starting aids to capacitively couple the high voltage developed across the excitation coil turns into the arc tube. As a result of this voltage gradient, a capacitive current flows between the starting aid and the excitation coil, and hence through the arc tube, thereby ionizing the gaseous fill and producing a low current glow discharge therein. When the gas is sufficiently ionized, a transition is made from a relatively low current glow discharge to a relatively high current, high intensity solenoidal arc discharge. Such a starting aid may comprise, for example, a pair of capacitive starting electrodes, as described in U.S. Pat. No. 4,902,937 of H. L. Witting, issued Feb. 20, 1990, and assigned to the instant assignee, which patent is incorporated by reference herein. Each starting electrode comprises a conductive ring which surrounds the arc tube and is connected to the excitation coil of the HID lamp. Coupling a high voltage signal between the pair of starting electrodes causes an electric field to be produced therebetween which is of sufficient magnitude to create a glow discharge in the arc tube due to the arc tube wall capacitance. Furthermore, as it has been determined that the application of relatively large electric fields directly to the arc tube via the starting aid may cause early arc tube degradation, heat sensitive members, e.g. bimetallic strips, are utilized for moving the starting electrodes away from the arc tube after initiating an arc discharge, thereby preserving the useful life of the lamp.

Recently developed fixed starting aids for electrodeless HID lamps include means for removing the starting voltage from a fixed starting electrode after initiation of the arc discharge. For example, a gas probe starter includes a fixed starting electrode coupled to a starting chamber containing a gas, preferably at a low pressure relative to that of the arc tube fill, which chamber is attached to the outer surface of the arc tube. One such starting aid is the subject of commonly assigned Roberts et al. U.S. patent application, Ser. No. 622,247 filed Dec. 4, 1990, which is incorporated by reference herein. As described in the Roberts et al. application, a starting voltage is applied to the starting electrode by a starting circuit, causing the low-pressure gas in the starting chamber to become conductive. As a result, a sufficiently high voltage is applied to the arc tube to ionize the gaseous fill in the arc tube, thus forming an arc discharge therein. After the lamp has started, the starting voltage is removed from the starting electrode in order to extinguish the discharge current in the chamber which would otherwise have a detrimental effect on the arc tube wall.

A suitable starting circuit for applying a starting voltage to either a fixed or movable starting aid is described in commonly assigned, copending U.S. patent application, Ser. No. 622,024, of J. P. Cocoma and G. A. Farrall, filed Dec. 4, 1990, which is incorporated by reference herein. The starting circuit of the Cocoma and Farrall application, Ser. No. 622,024, includes a series resonant circuit which is tuned to provide a starting voltage substantially simultaneously with the application of power to the excitation coil from the main power source. The resonant starting circuit of the Cocoma and Farrall application, Ser. No. 622,024, includes a variable inductance coupled in series with the parasitic capacitance between the excitation coil of the lamp and a starting probe. The variable inductance may comprise either a tuning inductor, or a fixed inductor coupled in parallel with a tuning capacitor, or a fixed capacitor coupled in parallel with a tuning inductor.

The series resonant starting circuit of the Cocoma and Farrall application, Ser. No. 622,024, cited hereinabove, is activated by the lamp ballast via parasitic capacitances between the starting circuit and the excitation coil. Although the starting voltage generated by such an indirectly coupled starting ciruit is generally sufficient to initiate the arc discharge in the lamp, it is limited by the physical arrangement of the starting circuit with respect to the lamp and starting probe. However, it is desirable to increase the starting voltage even further because an increased starting voltage results in more rapid starting. Of course, an increased starting voltage can be attained by using a separate power supply to generate power to the starting circuit. In general, however, using a separate power supply is not an attractive alternative to a passive starting circuit. Hence, it is desirable to improve the starting capability of an electrodeless HID lamp (for example, to achieve more rapid starting) without requiring a separate power supply.

OBJECTS OF THE INVENTION

Accordingly, an object of the present invention is to provide a new and improved starting circuit for an electrodeless HID lamp.

Another object of the present invention is to provide a starting circuit for an electrodeless HID lamp which generates a relatively high starting voltage without requiring an additional power supply.

Still another object of the present invention is to provide a starting circuit for an electrodeless HID lamp which provides improved starting and interacts with the lamp ballast such that little, if any, retuning of the ballast is required after the lamp has started.

SUMMARY OF THE INVENTION

A passive starting circuit for an electrodeless HID lamp includes a series resonant LC circuit including an inductor coupled in parallel with a variable capacitor and in series with the parasitic capacitance between a starting probe and the excitation coil of the lamp, and further including a coupling capacitance for directly coupling the starting circuit to the excitation coil. Specifically, the coupling capacitance is connected between the high terminal of the excitation coil, or a point in the circuit at approximately the same potential thereof, and a conductive support for holding the lamp and starting probe in a lamp fixture. Advantageously, the starting voltage is thus maximized for more efficient and rapid starting.

In another aspect of the present invention, the series resonant capacitance of the starting circuit is optimized to maximize the starting voltage while ensuring that little, if any, retuning of the ballast is required to maintain the ballast in tune after the lamp has started.

BRIEF DESCRIPTION OF THE DRAWINGS

The features and advantages of the present invention will become apparent from the following detailed description of the invention when read with the accompanying drawings in which:

FIGS. 4A–4E graphically illustrates the effect of optimizing the series resonant capacitance of the starting circuit in accordance with the present invention.

DETAILED DESCRIPTION OF THE INVENTION

Figure 1:
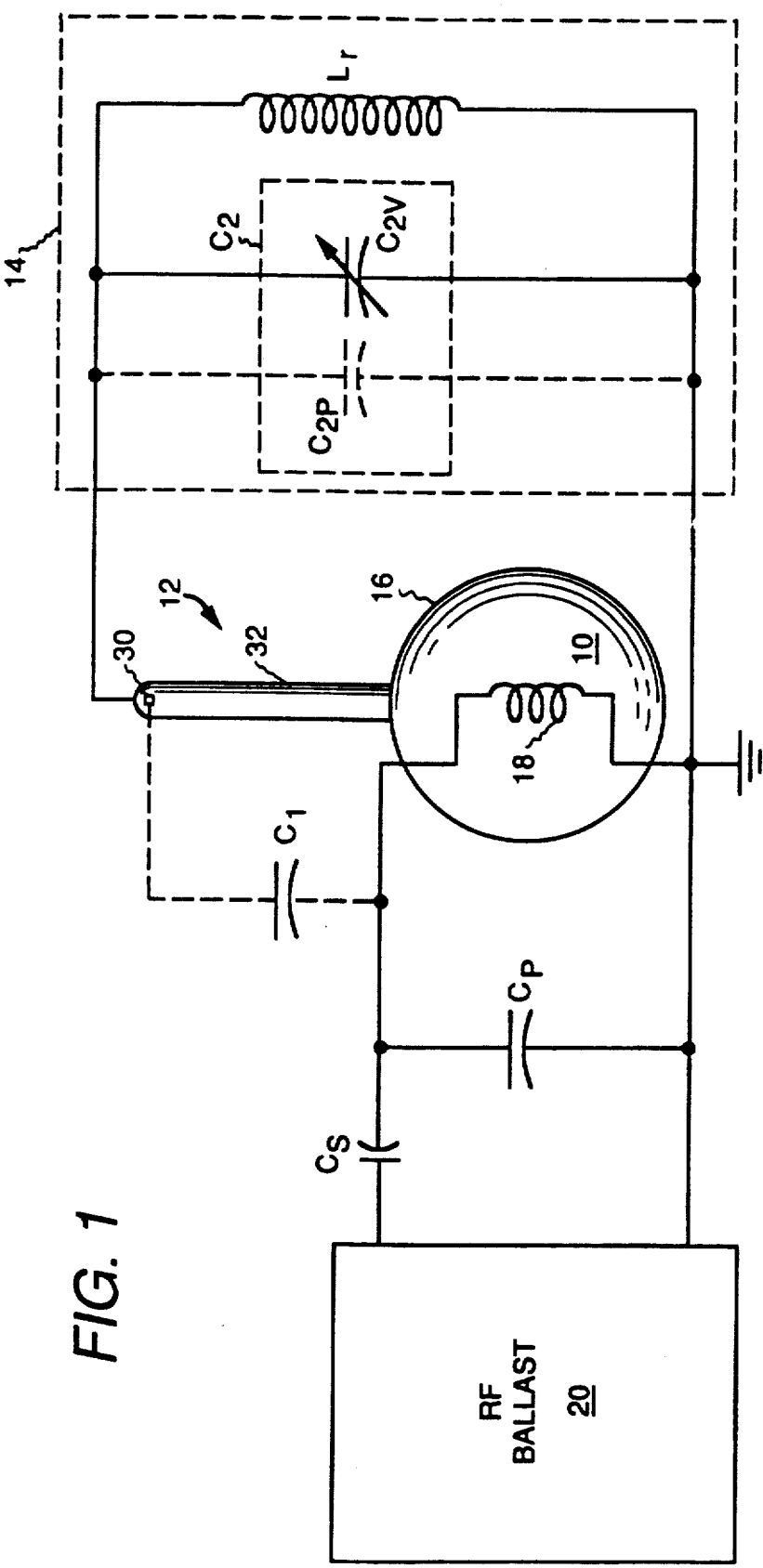
FIG. 1 is a schematic illustration of an electrodeless HID lamp system including a passive resonant starting circuit.

FIG. 1 illustrates an HID lamp system, including an electrodeless HID lamp 10 employing a starting probe 12 coupled to a starting circuit 14 such as that described in Cocoma and Farrall application, Ser. No. 622,024, cited hereinabove. Lamp 10 includes a light-transmissive arc tube preferably formed of a high temperature glass, such as fused quartz, or an optically transparent ceramic, such as polycrystalline alumina. An excitation coil 18 surrounds arc tube 16 and is coupled to a radio frequency (RF) ballast 20 for exciting an arc discharge in a fill contained within the arc tube. For clarity of illustration, however, excitation coil 18 is not shown in its operational position about arc tube 16, but is shown only schematically in FIG. 1.

A suitable arc tube fill, described in U.S. Pat. No. 4,810,938 of P. D. Johnson, J. T. Dakin and J. M. Anderson, issued on Mar. 7, 1989 and assigned to the present assignee, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. The Johnson et al. patent is incorporated by reference herein. Another suitable fill is described in commonly assigned U.S. Pat. No. 4,972,120 of H. L. Witting, issued Nov. 20, 1990, which is incorporated by reference herein. The fill of the Witting patent comprises a combination of a lanthanum halide, a sodium halide, a cerium halide and xenon or krypton as a buffer gas; for example, a fill according to the Witting patent may comprise a combination of lanthanum iodide, sodium iodide, cerium iodide, and 250 torr partial pressure of xenon.

An exemplary excitation coil 18 is described in commonly assigned, copending U.S. patent application of G. A. Farrall, Ser. No. 493,266, filed Mar. 14, 1990, now allowed, which is incorporated by reference herein. The overall shape of the excitation coil of the Farrall application, Ser. No. 493,266, is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J. M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation coil may be of solenoidal shape, for example.

RF ballast 20 may comprise, for example, a Class-D power amplifier, such as the ballast described in commonly assigned, copending U.S. patent application of S. A. El-Hamamsy and J. C. Borowiec, Ser. No. 472,144, filed Jan. 30, 1990, now allowed, which is incorporated by reference herein. The Class-D ballast includes two switching devices connected in series with a dc power supply in a half-bridge configuration. In operation, the switching devices are driven alternately between cutoff and saturation such that one is conducting while the other one is turned off and vice versa. Hence, the Class-D ballast may be conveniently driven by a square wave signal.

As illustrated in FIG. 1, a resonant load network is coupled to the output of ballast 20. The resonant load network comprises the excitation coil 18 of HID lamp 10 and a tuning capacitor $C_p$ connected in parallel therewith. The parallel combination of capacitor $C_p$ and coil 18 functions as an impedance transformer to reflect the impedance of the arc discharge into the ballast load. A blocking/tuning capacitor $C_s$ is connected in series with the parallel combination of coil 16 and capacitor $C_p$. In particular, capacitor $C_s$ is used both for blocking dc voltage and for resonant circuit tuning. As described in the El-Hamamsy and Borowiec patent application, Ser. No. 472,144, cited hereinabove, capacitors $C_s$ and $C_p$ are chosen to ensure impedance matching for maximum efficiency.

By way of example, starting probe 12 is illustrated in FIG. 1 as comprising a gas probe starter, such as that described in Roberts et al. U.S. patent application, Ser. No. 622,247, cited hereinabove. In particular, gas probe starter 12 comprises a starting electrode 30 coupled to a starting chamber 32 which is attached to the outer wall of arc tube 16 and contains a gas. The gas in starting chamber 32 may comprise, for example, a rare gas at a pressure in the range from approximately 0.5 to 500 torr, with a preferred range being from approximately 5 to 40 torr. Preferably, the gas in chamber 32 is at a low pressure relative to that of the arc tube fill in order to promote even easier starting. In an exemplary HID lamp system, a suitable arc tube fill pressure may be approximately 200 torr while that of the gas in starting chamber 32 may be approximately 20 torr. It is to be understood, however, that the starting circuit of the present invention may be used with other suitable types of starting probes, such as a a fixed foil electrode of the type described in commonly assigned, copending U.S. patent application of S. A. El-Hamamsy and R. J. Thomas, Ser. No. 527,500, filed May 23, 1990, which is incorporated by reference herein. Still other suitable starting electrodes may be movable, if desired, such as those described in: Witting U.S. Pat. No. 4,902,937; Witting U.S. Pat. No. 4,894,590; and Borowiec U.S. Pat. No. 4,894,589, all of which are incorporated by reference herein.

Starting circuit 14 comprises a series resonant LC circuit of including an inductor coupled in parallel with a variable capacitance $C_2$ and in series with the parasitic capacitance $C_1$ (shown in phantom in FIG. 1) between starting probe 12 and excitation coil 18. The variable capacitance $C_2$ is shown as comprising a variable capacitor $C_{2v}$ coupled in parallel with parasitic capacitances $C_{2p}$ (shown in phantom). The parallel combination of inductor $L_r$ and variable capacitance $C_2$ effectively comprises a variable series resonant inductance at frequencies lower than the parallel resonant frequency of the combination of $L_r$ and $C_2$; otherwise, the starting circuit would not operate as a series resonant circuit. (It will be appreciated by those of skill in the art that a variable series resonant inductance may be constructed in other suitable ways, such as by using the parallel combination of a fixed capacitor and a variable inductor, for example.) The variable capacitor $C_{2v}$ is used to tune the series resonant circuit ($L_r$, $C_2$ and $C_1$) to resonate at the operating frequency of the ballast, e.g. 13.56 MHz.

In operation, variable capacitor $C_{2v}$ of FIG. 1 is tuned to a predetermined value so that, when an RF signal is applied to excitation coil 18 via ballast 20, the LC starting circuit, which is capacitively coupled to the excitation coil by parasitic capacitance $C_1$, resonates to apply a starting voltage to electrode 30. Unfortunately, the starting voltage is limited by the value of parasitic capacitance $C_1$ as determined by the physical arrangement of the starting circuit components. In particular, for a two-turn excitation coil such as that described hereinabove with reference to the Farrall application, Ser. No. 493,266, the maximum attainable voltage coupled to the starting circuit is a fraction of the voltage across the excitation coil. For example, a convenient physical layout of the lamp starting system has the coil turn that is closest to ground potential positioned to face the starting probe so that the maximum average voltage capacitively coupled from the coil to the starting electrode is approximately one-fourth the coil voltage. Although this voltage is generally sufficiently high to initiate an arc discharge in the lamp, more efficient and rapid starting would result if the voltage coupled to the starting circuit were even higher.

Figure 2:
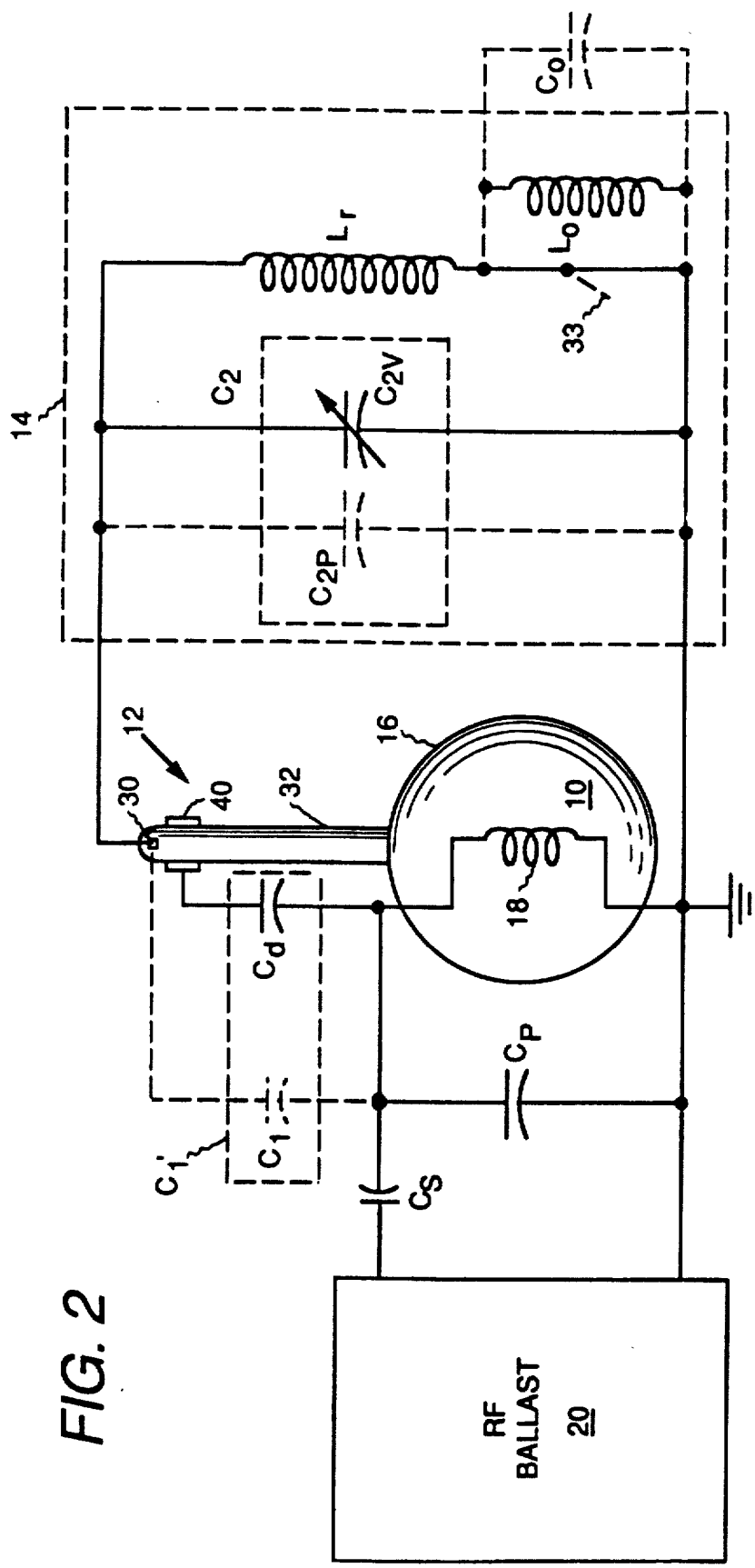
FIG. 2 is a schematic illustration of a passive resonant starting circuit in accordance with the present invention.

FIG. 2 illustrates a passive starting circuit according to the present invention for providing a higher starting voltage to starting electrode 30 and hence improving the starting capability of the lamp. In particular, direct capacitive coupling between the starting circuit and the ballast is provided by a capacitor $C_d$ between a lamp support 40, which is provided to hold lamp 10 in a lamp fixture (not shown), and the high terminal of excitation coil 18. Alternatively, the direct-coupling capacitor $C_d$ need not be coupled directly to the excitation coil, but may be coupled to another point in the circuit at a potential approximately equal to that of the high terminal of the excitation coil. In FIG. 2, the series resonant capacitance $C_1'$ represents the sum of parasitic capacitance $C_1$ and direct-coupling capacitor $C_d$. As a result of the direct capacitive coupling between the voltage across the excitation coil and the lamp support, the maximum voltage coupled to the starting circuit is substantially equal to the full voltage across the excitation coil, yielding a higher voltage generated by the starting circuit and applied to the starting probe than that generated by the circuit of FIG. 1.

Figure 3:
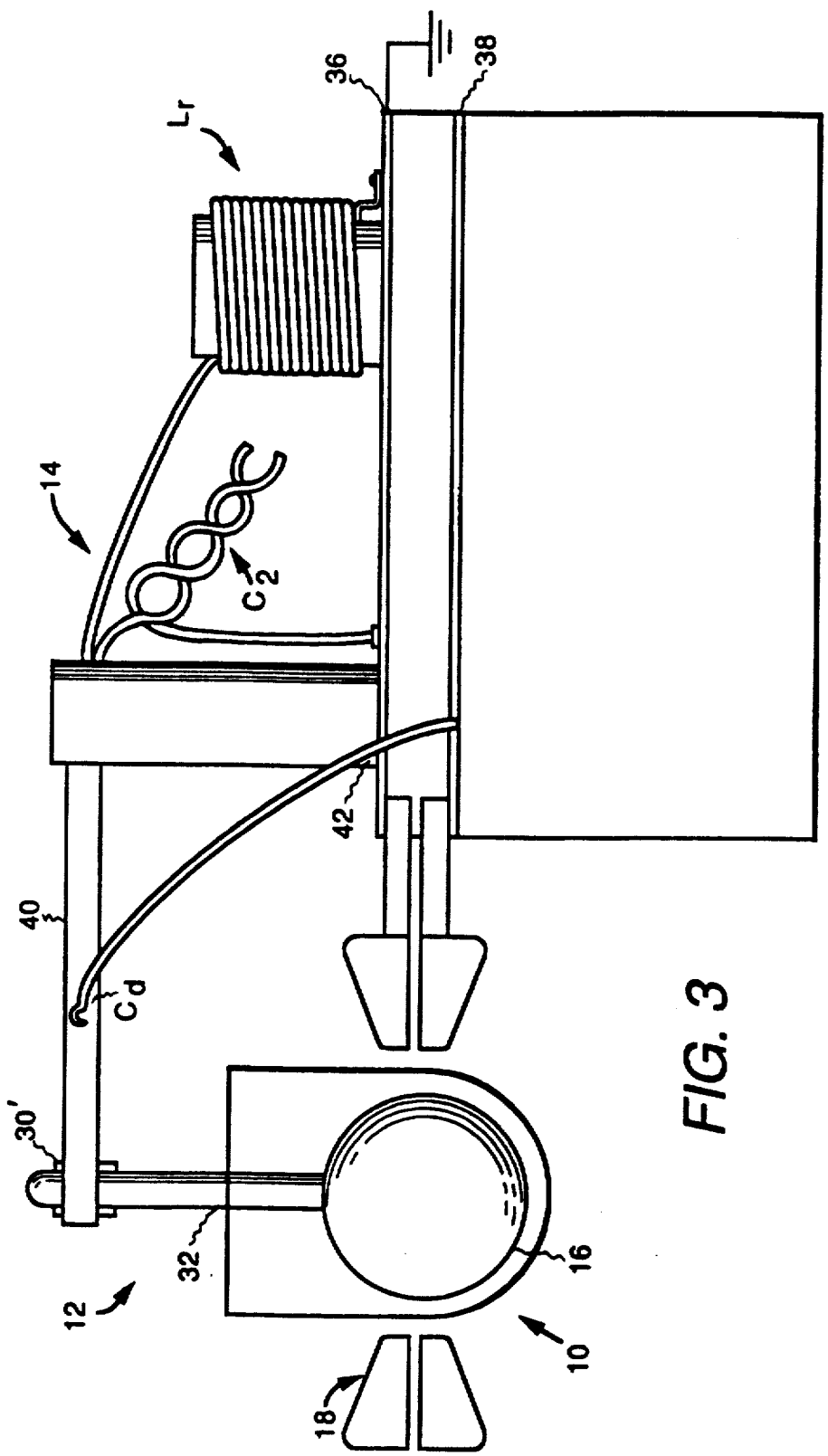
FIG. 3 is a front view of a preferred implementation of the passive resonant starting circuit of the present invention.

FIG. 3 illustrates a preferred implementation of the starting circuit of the present invention. As shown, conductive plates 36 and 38 of parallel capacitance $C_p$ at the output of ballast 20 (FIG. 1) preferably comprise heat sink plates for removing excess heat from excitation coil 18. For purposes of illustration, plates 36 and 38 are shown as being L-shaped in FIG. 2. An exemplary integrated heat sink and capacitor structure is the subject of U.S. patent application, Ser. No. 472,144, of J. C. Borowiec and S. A. El-Hamamsy, cited hereinabove. Another exemplary integrated heat sink and capacitor structure is the subject of commonly assigned U.S. patent application of G. A. Farrall and J. C. Borowiec, Ser. No. 586,927, filed Sep. 24, 1990, which patent application is also incorporated by reference herein. As shown in FIG. 3, tuning capacitor $C_2$ and inductor $L_r$ are mounted on plate 36, which is coupled to ground. Tuning capacitor $C_2$ is shown schematically as comprising a pair of wires twisted together, the value of capacitor $C_2$ being changed merely by twisting the wires more or less, as needed. The parallel combination of capacitor $C_2$ and inductor $L_r$ is coupled to gas probe starter 12, which is illustrated in FIG. 3 as including a foil electrode 30' disposed about chamber 32. Support 40 is insulated from plate 36 by an insulating support 42. As shown in FIG. 3, direct-coupling capacitor $C_d$ comprises a wire loop, e.g. of relatively heavy copper, attached to a heat sink plate 38 of ballast capacitor $C_p$. The capacitance of direct-coupling capacitor $C_d$ is determined by the distance between the looped end of the wire and lamp support 40. According to the present invention, the capacitance of direct-coupling capacitor $C_d$ is optimized to provide as large a starting voltage as possible to initiate an arc discharge in the arc tube without causing electrical breakdown, i.e., a short circuit, between the lamp support and the excitation coil of the lamp. In an exemplary HID lamp system, the starting voltage was increased from 1-2 kV to 3-8 kV by employing direct capacitive coupling in accordance with the present invention.

If desired, a switch, or a parallel combination of a switch 33 and an additional resonant circuit $L_O$ and $C_O$, as illustrated in phantom in FIG. 2 and described in the Cocoma et al. patent application, Ser. No. 622,024, cited hereinabove, may be coupled in the resonant circuit so as to be opened after initiation of the arc discharge in order to detune the starting circuit. The switch may be situated in series with either the resonant inductor $L_r$ (as shown), the resonant capacitor $C_2$ or the series continuation of the inductor and the capacitor. Initially, the switch is closed. However, after the lamp has started, the switch is opened in order to ensure that the circuit becomes sufficiently detuned to extinguish the glow discharge in chamber 32.

In another aspect of the present invention, the series resonant capacitance $C_1'$ is optimized to maximize the starting voltage while ensuring that the ballast is in tune under both starting and running conditions with minimal, if any, retuning of the ballast required after the lamp has started. In particular, for maximum efficiency, as described in commonly assigned, copending U.S. patent application, Ser. No. 534,574, filed Jun. 7, 1990, of S. A. El-Hamamsy and J. C. Borowiec, a variable capacitor in series with the excitation coil of the lamp is used to automatically tune the ballast as the output impedance thereof changes between starting and running conditions. According to U.S. patent application, Ser. No. 534,574, cited hereinabove, a suitable variable capacitor comprises a piezoelectrically actuated variable capacitor. Another suitable variable capacitor comprises a liquid crystal variable capacitor, as described in commonly assigned, copending U.S. patent application, Ser. No. 656,665, of S. A. El-Hamamsy and C. P. Yakymyshyn. As an advantage of the present invention, by optimizing the value of the series resonant capacitance $C_1'$ (FIG. 2), the ballast requires little, if any, retuning after the lamp has started. Therefore, in accordance with the present invention, by suitably choosing the value of direct-coupling capacitor $C_d$, the starting voltage will be maximized for more rapid and reliable starting, and there will be sufficient interaction between the starting circuit and the ballast to ensure that the ballast is in tune under both starting and running conditions without requiring the ballast to be retuned after the lamp has started.

As a first step in the optimization process, the series resonant capacitance $C_{res}$ of the starting circuit 14 is defined as:

$$C_{res} = C_1' + C_2.$$

where the resonant capacitance $C_{res}$ satisfies the relationship:

$$C_{res} = \frac{1}{2\pi \sqrt{L_r \cdot C_{res}}}$$

Figure 4C:
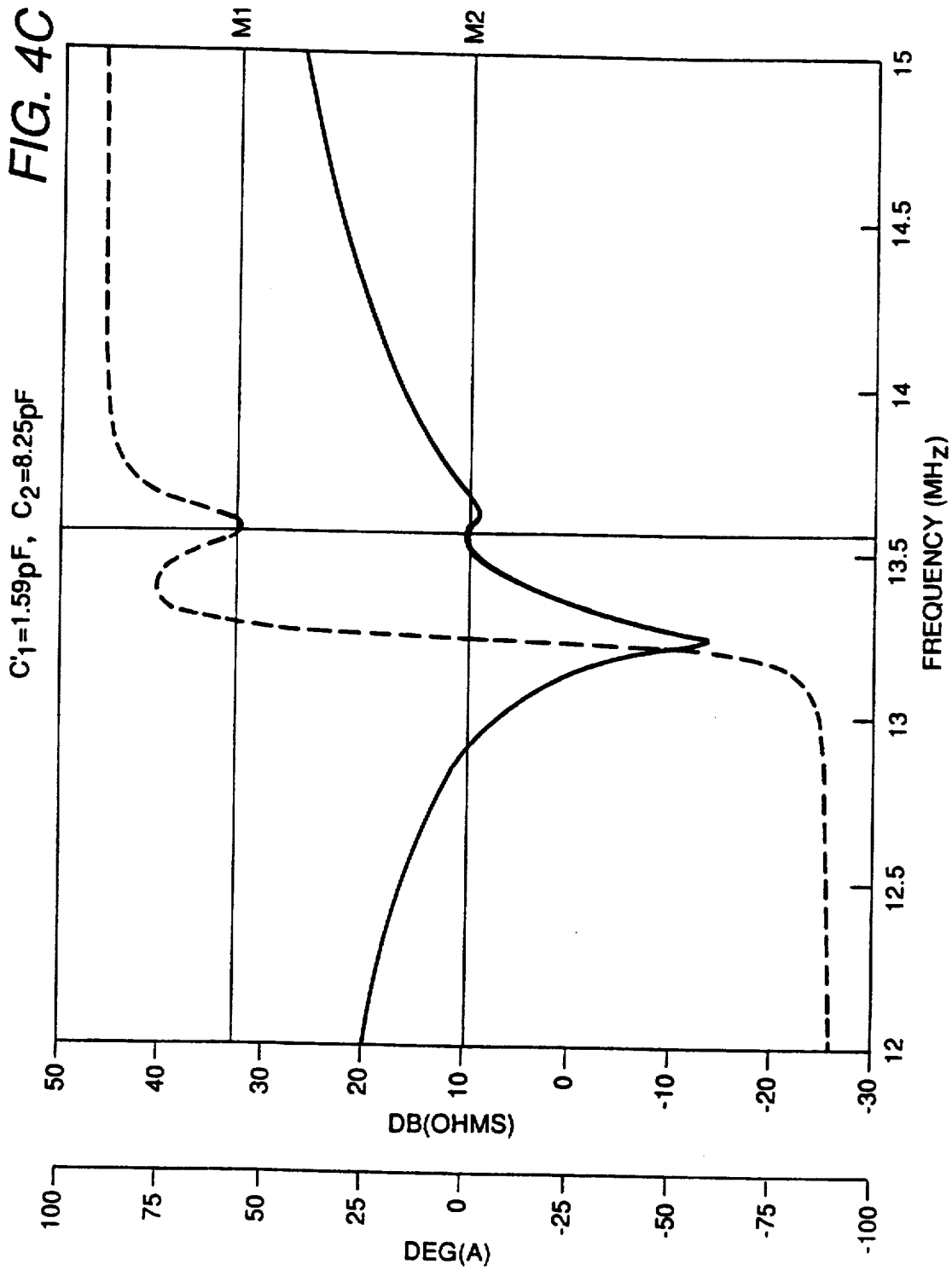

For example, for an operating frequency of 13.56 MHz and an inductor $L_r$ of approximately 14 $\mu$H, $C_{res}$=9.84 picofarads (pF). FIG. 4 shows the effect of varying the ratio of $C_d$ to $C_2$ on the tuning of the ballast, with the dashed lines representing the phase angle and the solid lines representing the magnitude of the load impedance of the ballast. Specifically, FIG. 4 represents: (a) the ballast load impedance without a starting circuit, i.e., the extreme case where there is No. interaction between the ballast and the starting circuit; (b) the ballast load impedance under conditions before starting with $C_1'$=0.84 pF and $C_2$=9.0 pF; (c) the ballast load impedance under conditions before starting with $C_1'$=1.59 pF and $C_2$=8.25 pF; (d) the ballast load impedance under lamp-running conditions with $C_1'$=1.59 pF and $C_2$=8.25 pF; and (e) the ballast load impedance with $C_1'$=3.34 pF and $C_2$=6.5 pF. At an exemplary operating frequency of 13.56 MHz, it has been found that the ballast load impedance must be in the range from approximately 35°-60° in order for the lamp to start. For a lamp without a starting circuit, as illustrated in FIG. 4(a), the ballast load impedance is approximately 90°, illustrating a situation wherein the lamp will not start. From FIG. 4(b), the slight dips in the dashed and solid lines at 13.56 MHz indicate minimal interaction between the starting circuit and the ballast for $C_1'$=0.84 pF and $C_2$=9.0 pF, representing the usual situation, as described in U.S. patent application Ser. No. 534,574, wherein the ballast has to be retuned after the lamp has started. However, with $C_1'$=1.59 pF and $C_2$=8.25 pF, there is much greater interaction between the ballast and the starting circuit, and the value of $C_{res}$ is chosen such that the ballast is in tune for both starting and running conditions. Moreover, capacitance $C_1'$ can be made too large, as shown in FIG. 4(e), such that there is too much interaction between the starting circuit and the ballast, resulting in a failure of the lamp to start. Hence, in accordance with the present invention, the resonant capacitance is optimized to maximize the starting voltage while ensuring that little, if any, retuning of the ballast load circuit is required after the lamp has started.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A starting circuit for an electrodeless high intensity discharge lamp of the type having an excitation coil situated about an arc tube and coupled to a radio frequency power supply for exciting an arc discharge in an ionizable fill contained in said arc tube, said excitation coil having high and low terminals, comprising:

a starting probe disposed proximate to said arc tube;

a conductive support for holding said arc tube and said starting probe in a lamp fixture;

series resonant circuit means for receiving a radio frequency signal from said radio frequency power supply and providing a resonant starting voltage to said starting probe, said series resonant circuit means including a variable inductance coupled in series with a parasitic capacitance between said excitation coil and said starting probe; and capacitive coupling means for providing direct capacitive coupling between said support and the high terminal of said excitation coil, the capacitance of said capacitive coupling means being optimized to maximize the voltage coupled to the resonant circuit means, thereby maximizing said starting voltage.

2. The starting circuit of claim 1 wherein said variable inductance comprises a fixed inductor coupled in parallel with a variable capacitor.

3. The starting circuit of claim 1 wherein said starting probe comprises a gas probe starter including:
   a starting chamber containing a gas, said chamber being attached to the outer wall of said arc tube; and
   a starting electrode for coupling said starting voltage to the interior of said starting chamber so as to initiate a flow discharge in said starting chamber which is capacitively coupled to the fill in said arc tube.

4. The starting circuit of claim 1 wherein said capacitive coupling means comprises a wire loop connected to the high terminal of said excitation coil and disposed proximate to, but spaced apart from, said conductive support.

5. The starting circuit of claim 1, further comprising detuning means coupled to said resonant circuit means for detuning said starting circuit after initiation of the arc discharge.

6. The starting circuit of claim 5 wherein said detuning means comprises a detuning switch coupled in said resonant circuit so as to be opened after initiation of the arc discharge in order to detune said starting circuit, thereby substantially reducing said starting voltage.

7. A starting circuit for an electrodeless high intensity discharge lamp of the type having an excitation coil situated about an arc tube and coupled to a resonant ballast circuit for exciting an arc discharge in an ionizable fill contained in said arc tube, said excitation coil having high and low terminals, comprising:
   a starting probe disposed proximate to said arc tube;
   a conductive support for holding said arc tube and said starting probe in a lamp fixture;
   series resonant circuit means for receiving a radio frequency signal from said resonant ballast circuit and providing a resonant starting voltage to said starting probe, said series resonant circuit means including a variable inductance coupled in series with a parasitic capacitance between said excitation coil and said starting probe; and
   capacitive coupling means for providing direct capacitive coupling between said support and the high terminal of said excitation coil, the capacitance of said capacitive coupling means being optimized to maximize said starting voltage while ensuring that said resonant ballast circuit is substantially in tune under both starting and running conditions.

8. The starting circuit of claim 7 wherein said variable inductance comprises a fixed inductor coupled in parallel with a variable capacitor.

9. The starting circuit of claim 7 wherein said starting probe comprises a gas probe starter including:
   a starting chamber containing a gas, said chamber being attached to the outer wall of said arc tube; and
   a starting electrode for coupling said starting voltage to the interior of said starting chamber so as to initiate a flow discharge in said starting chamber which is capacitively coupled to the fill in said arc tube.

10. The starting circuit of claim 7 wherein said capacitive coupling means comprises a wire loop connected to the high terminal of said excitation coil and disposed proximate to, but spaced apart from, said conductive support.

11. The starting circuit of claim 7, further comprising detuning means coupled to said resonant circuit means for detuning said starting circuit after initiation of the arc discharge.

12. The starting circuit of claim 11 wherein said detuning means comprises a detuning switch coupled in said resonant circuit so as to be opened after initiation of the arc discharge in order to detune said starting circuit, thereby substantially reducing said starting voltage.

* * * * *